(12) United States Patent
Chiu et al.

(10) Patent No.: US 8,517,586 B2
(45) Date of Patent: Aug. 27, 2013

(54) ILLUMINATION DEVICE HAVING LIGHT-AGGREGATION, LIGHT-MIX AND LIGHT-ABSORBING COMPONENTS

(75) Inventors: Huan-Ping Chiu, Tainan (TW); Yao-Chien Cheng, Tainan (TW)

(73) Assignee: Chi Lin Technology Co., Ltd., Tainan (TW)

( * ) Notice: Subject to any disclaimer, the term of this patent is extended or adjusted under 35 U.S.C. 154(b) by 285 days.

(21) Appl. No.: 13/017,008

(22) Filed: Jan. 30, 2011

(65) Prior Publication Data
US 2012/0195038 A1    Aug. 2, 2012

(51) Int. Cl.
*F21V 7/04*    (2006.01)
(52) U.S. Cl.
USPC ........... 362/555; 362/241; 362/243; 362/245; 362/247
(58) Field of Classification Search
USPC ............... 362/249.02, 249.05, 555, 241, 243, 362/245, 247
See application file for complete search history.

(56) References Cited

U.S. PATENT DOCUMENTS

| 5,590,955 | A | 1/1997 | Bornhorst et al. |
| 7,525,127 | B2* | 4/2009 | Hattori et al. .................... 257/99 |
| 8,002,413 | B2* | 8/2011 | Narikawa ......................... 353/37 |
| 8,197,090 | B2* | 6/2012 | Kim et al. ................ 362/249.02 |
| 8,267,528 | B2* | 9/2012 | Conner et al. ................... 353/94 |
| 2006/0062013 | A1* | 3/2006 | Imade ............................ 362/551 |
| 2006/0072339 | A1* | 4/2006 | Li et al. ......................... 362/608 |
| 2010/0097808 | A1 | 4/2010 | Jurik |
| 2013/0003388 | A1* | 1/2013 | Jensen et al. ............. 362/296.01 |

FOREIGN PATENT DOCUMENTS

| TW | 261217 | 10/1995 |
| TW | I267687 B | 12/2006 |
| TW | 200902903 A | 1/2009 |
| TW | I325278 B | 5/2010 |

* cited by examiner

*Primary Examiner* — Robert May
(74) *Attorney, Agent, or Firm* — Cheng-Ju Chiang

(57) ABSTRACT

An illumination device is provided in the present disclosure. The illumination device may include a substrate having a first surface, at least one light-aggregation component having a free-form curved surface and located on the first surface, at least one light source at least partially surrounded by the light-aggregation component, and a light-mix component positioned adjacent to the first surface and the at least one light-aggregation component thereof.

19 Claims, 3 Drawing Sheets

ILLUMINATION DEVICE HAVING LIGHT-AGGREGATION, LIGHT-MIX AND LIGHT-ABSORBING COMPONENTS

TECHNICAL FIELD

The present invention disclosure generally relates to an illumination device, and more particularly an illumination device to condense light.

BACKGROUND

An illumination device generally employs at least one light source to emit light, such that the illumination device may be applied into various conditions. Since a light-emitting diode (LED) has many advantages, such as long lifetime, low power consumption, high luminance, and good environmental protection, etc., it has been widely used in the illumination device as the light source.

Referring to FIG. 1, a typical illumination device 10 is provided. As shown in FIG. 1, the typical illumination device 10 may be a projection lamp, which may comprise a light source 11, a lens 12, an integration rod 13 and a reflector 14. The light source 11 includes various LEDs, such as red LEDs, green LEDs or blue LEDs. Lights emitted from the red LEDs, the green LEDs and the blue LEDs pass through the lens 12 and are mixed in the integration rod 13. Then, the light reflected by the reflector 14 so as to be collected to the axis of the integration rod 13.

However, the typical illumination device 10 used as the projection lamp is prone to generate ghost images and stray light. Furthermore, the typical illumination device 10 used as the projection lamp does not have a zoom function, and cannot project specific light patterns, and has a low contrast ratio.

BRIEF DESCRIPTION OF THE DRAWINGS

The components in the drawing are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF EMBODIMENTS

Reference will now be made to the drawings to described exemplary embodiments in detail.

Figure 1:
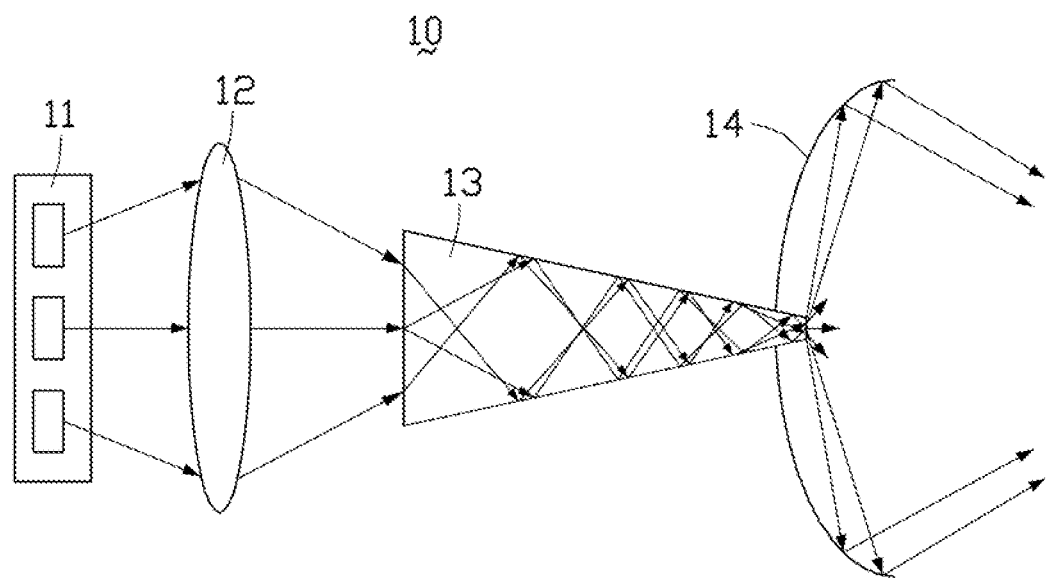
FIG. 1 is a cross-sectional view of a typical projection lamp according to the prior art.
Figure 2:
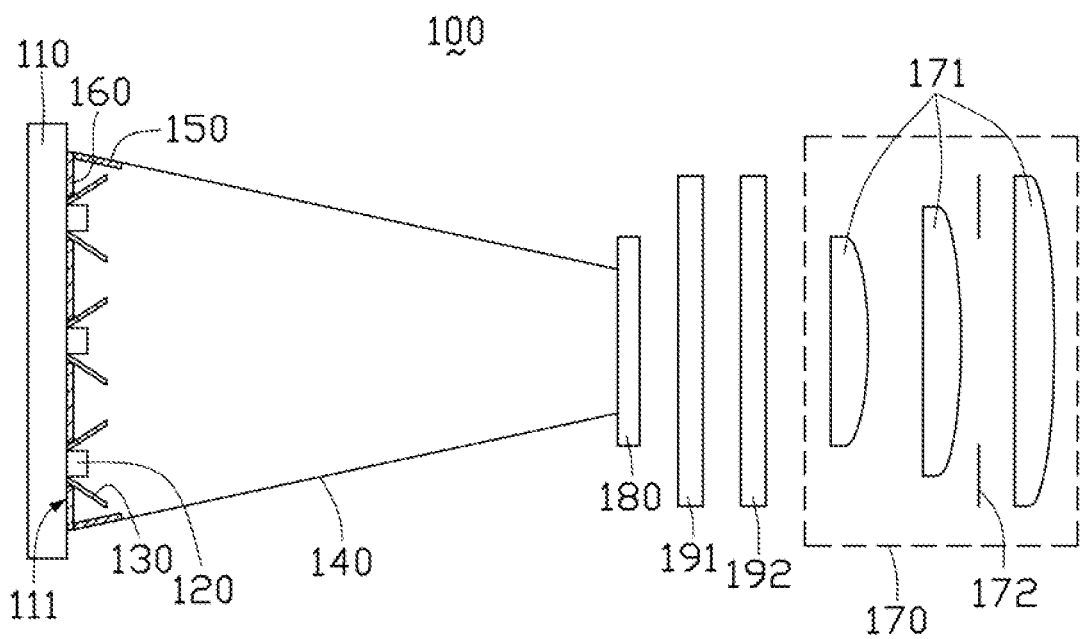
FIG. 2 is a cross-sectional view of an illumination device in accordance with an exemplary embodiment of the present disclosure.
Figure 3:
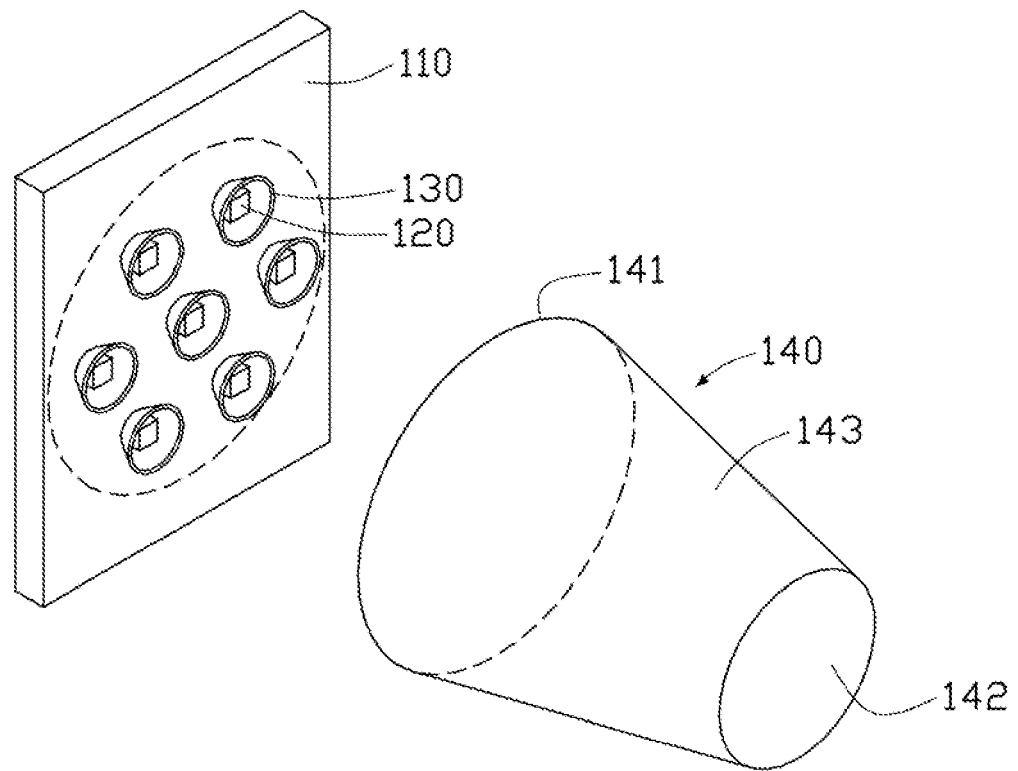
FIG. 3 is a partial exploded view of the illumination device as shown in FIG. 2.

FIG. 2 is a cross-sectional view of an illumination device in accordance with an exemplary embodiment of the present disclosure, and FIG. 3 is a partial exploded view of the illumination device as shown in FIG. 2. Preferably, the illumination device may be a projection lamp, such as a stage searchlight. Referring to FIG. 2-3, the illumination device 100 may comprise a substrate 110, a plurality of light source 120, a plurality of light-aggregation components 130 and a light-mix component 140.

The substrate 110 has a first surface 111 such that the light source 120 and the light-aggregation components 130 located on the first surface 111 of the substrate 110. At least one light source 120 disposed on the first surface 111 of the substrate 110, and the light source 120 is a light-emitting diode (LED). Preferably, the light source 120 may be one or more colored LEDs or a single LED with multiple colored chips which emit different colored lights that are mixed within. For example, red LED, green LED, blue LED, RGB LED, and RGBW LED. Alternatively, the light source 120 also may only a white LED for emitting white light.

Figure 5A:
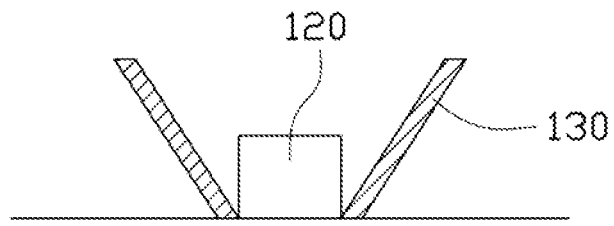
FIGS. 5A, 5B, 5C are different cross-sectional view of light-aggregation component.
Figure 5B:
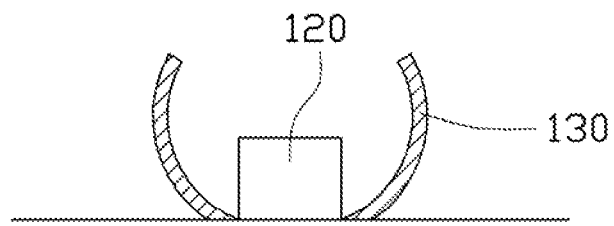
Figure 5C:
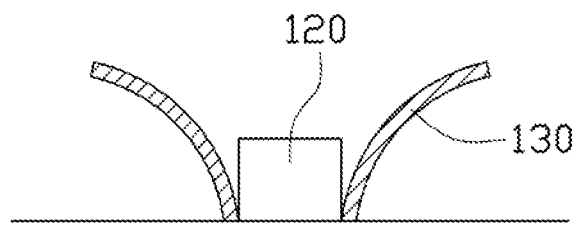

At least one light-aggregation component 130 located on the first surface 111 of the substrate 110, and at least one light source 120 is at least partially surrounded by the light-aggregation component 130, and a light-mix component 140 is positioned adjacent to the first surface 111 and the at least one light-aggregation component 130 thereof. Preferably, each light-aggregation component 130 with inner surface is a reflector configured for reflecting light emitted from the light source 120 therein. The inner surface of the light-aggregation component is a free-form curved surface or plane surface, as shown in FIGS. 5A, 5B, 5C. Alternatively, the light-aggregation component 130 is a TIR (total internal reflection) lens configured for reflecting light emitted from the light source 120 therein.

Figure 4:
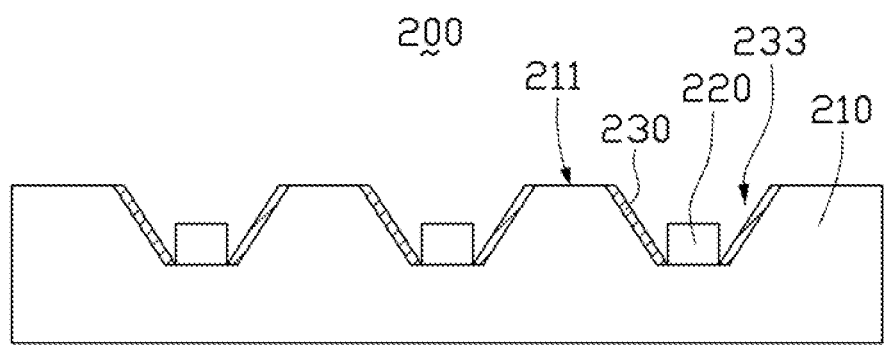
FIG. 4 is a partial cross-sectional view of an illumination device in accordance with another exemplary embodiment of the present disclosure.

Furthermore, in the exemplary embodiment, each light-aggregation component 130 may protrude from the first surface 111 of the substrate 110. Alternatively, refer to FIG. 4, which is a partial cross-sectional view of an illumination device in accordance with another exemplary embodiment. As shown in FIG. 4, the light-aggregation component 230 of the illumination device 200 rested in recesses 233 of the first surface 211 of the substrate 210 respectively. Each light source 220 located in the recess 233 of the first surface 211 respectively, and each light source 220 surrounded by the light-aggregation component 230 with free-form curved surface.

In the present disclosure, each light source 120 located on the first surface 111 of the substrate 110 and surrounded by the corresponding one of the light-aggregation components 130, thus the light-aggregation components 130 may reflect the light emitted from the light sources 120 respectively, and the issue of the ghost images and the stray light could be resolved.

As shown in FIGS. 2-3, a light-mix component 140 positioned adjacent to the first surface 111 of the substrate 110 and at least one light-aggregation component 130 thereof. Preferably, the light-mix component 140 is an integration rod. The light-mix component 140 is configured for mixing the light emitted from the light source 120 and reflected by the light-aggregation components 130. The light-mix component 140 comprises a light-incident side 141, a light-emitting side 142 opposite to the light-incident side 141, and a body part 143 formed between the light-incident side 141 and the light-emitting side 142. The light-incident side 141 faces the first surface 111 of the substrate 110 and at least one light-aggregation component 130. Such that the light emitted from the light source 120 may enter the light-mix component 140 via the light-incident side 141, then be mixed in the body part 143 thereof, and finally emit from the light-emitting side 142 thereof.

Preferably, in the exemplary embodiment, the body part 143 of the light-mix component 140 is hollow and has an inner cavity surface covered by a light-reflecting material (not shown). Therefore, the light entering the light-mix component 140 may be reflected repeatedly by the light-reflecting material of the inner cavity surface of the body part 143, so that the light mixed therein. Alternatively, the body part 143 of the light-mix component 140 further may be solid and transparent, and have an outer surface covered by the light-reflecting material.

In addition, the illumination device 100 may further comprise a light-absorbing component 150 disposed on the surface of the body part 143 and positioned adjacent to the light-incident side 141. Preferably, the light-absorbing component 150 disposed on the inner cavity surface of the body part 143 and positioned adjacent to the light-incident side 141. The light-absorbing component 150 disposed on the inner cavity surface of the body part 143 may be surrounding continuously or interruptedly to the light sources 120 for further eliminating the stray light.

Furthermore, the illumination device 100 may further comprise another light-absorbing component 160 disposed on the first surface 111 of the substrate 110 except of the light-aggregation components 130, so as to further decrease the stray light. The light-absorbing component 150 and the light-absorbing component 160 may be made of a black material, such as ink, to absorbing the stray light. In addition, it should be understood for a person skilled in the art that, the illumination device 100 may only comprise the light-absorbing component 150, or only comprise the light-absorbing component 160, or comprise a combination of the light-absorbing component 150 and the light-absorbing component 160.

In addition, the illumination device 100 may further comprise certain optical components, such as a lens module 170, a zoom component 180, a gobo wheel 191 or a color wheel 192.

The lens module 170 arranged adjacent to the light-emitting side 142 of the light-mix component 140 for optically processing the light emitted from the light-mix component 140. The lens module 170 mainly comprises a plurality of lenses 171. In the exemplary embodiment, the lens module 170 may comprise three lenses 171 and an aperture 172. The aperture 172 may get better image formation, and the aperture 172 may be arranged adjacent to the lenses 171 or between any two adjacent lenses 171.

The zoom component 180 arranged between the light-mix component 140 and the lens module 170. The zoom component 180 may be an auto iris arranged adjacent to the light-emitting side 142 of the light-mix component 140 such that the illumination device 100 has a zoom function which can zoom in/out a pattern projected by the illumination device 100.

The gobo wheel 191 and the color wheel 192 are arranged between the zoom component 180 and the lens module 170. The gobo wheel 191 has a plurality of patterns formed therein, and the color wheel 192 has a plurality of color patterns formed therein. Therefore, the illumination device 100 can project different patterns and different colors to add decorative efficiency. In addition, it should be understood for a person skilled in the art that, the illumination device 100 may only employ the gobo wheel 191 or the color wheel 192, or employ a combination of the gobo wheel 191 and the color wheel 192 to project the pattern.

Finally, each the light source 120 surrounded by the corresponding the light-aggregation component 130 for condensing light and decreasing the ghost images and the stray light. The light-absorbing component 150 and light-absorbing component 160 are for decreasing the ghost images and the stray light. In addition, the illumination device 100 comprises the zoom component 180 used as the zoom component, thus the illumination device 100 has the zoom function. The illumination device 100 further comprises the gobo wheel 191 with patterns formed therein, thus the illumination device 100 can project different patterns. Another, the illumination device 100 comprises the color wheel 192 with a plurality of color patterns formed therein, thus the illumination device 100 can project different colors to add decorative efficiency.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broad general meaning of the terms in which the appended claims are expressed.

What is claimed is:

1. An illumination device, comprising:
   a substrate having a first surface;
   at least one light-aggregation component located on the first surface;
   at least one light source at least partially surrounded by the light-aggregation component; and
   a light-mix component positioned adjacent to the first surface and the at least one light-aggregation component thereof;
   wherein the light-mix component comprises a light-incident side, a light-emitting side opposite to the light-incident side, and a body part between the light-incident side and the light-emitting side, and wherein the light-incident side faces the first surface of the substrate and the at least one light-aggregation component;
   the body part is hollow and has an inner cavity surface covered by a light reflecting material; and
   a light-absorbing component is disposed on the inner cavity surface of the body part and positioned adjacent to the light-incident side.

2. The illumination device of claim 1, wherein the light source comprises a light-emitting diode.

3. The illumination device of claim 1, wherein the light-aggregation component with an inner surface is a reflector configured for reflecting light from the light source therein.

4. The illumination device of claim 3, wherein the inner surface of the light-aggregation component is a free-form curved surface.

5. The illumination device of claim 3, wherein the inner surface of the light-aggregation component is a plane surface.

6. The illumination device of claim 1, wherein the light-aggregation component protrudes from the first surface of the substrate.

7. The illumination device of claim 1, wherein the light-aggregation component rested in a recess of the first surface.

8. The illumination device of claim 1, wherein the light-mix component is an integration rod.

9. The illumination device of claim 1, further comprising:
   another light-absorbing component disposed on the first surface of the substrate.

10. The illumination device of claim 1, further comprising:
    a light-absorbing component disposed on the body part and positioned adjacent to the light-incident side, and another light-absorbing component disposed on the first surface of the substrate.

11. The illumination device of claim 1, further comprising:
    a lens module arranged adjacent to the light-mix component.

12. The illumination device of claim 11, further comprising:

a zoom component arranged between the light-mix component and the lens module.

13. The illumination device of claim 12, further comprising:
    a gobo wheel or a color wheel arranged between the zoom component and the lens module.

14. The illumination device of claim 1, wherein the light-absorbing component is made of a black material.

15. An illumination device, comprising:
    a substrate having a first surface;
    at least one light-aggregation component located on the first surface;
    at least one light source at least partially surrounded by the light-aggregation component; and
    a light-mix component positioned adjacent to the first surface and the at least one light-aggregation component thereof;
    wherein the light-mix component comprises a light-incident side, a light-emitting side opposite to the light-incident side, and a body part between the light-incident side and the light-emitting side, and wherein the light-incident side faces the first surface of the substrate and the at least one light-aggregation component;
    the body part is hollow and has an inner cavity surface covered by a light reflecting material;
    a light-absorbing component is disposed on the inner cavity surface of the body part and positioned adjacent to the light-incident side, and another light-absorbing component is disposed on the first surface of the substrate.

16. The illumination device of claim 15, wherein the light-absorbing component is made of a black material.

17. An illumination device, comprising:
    a substrate having a first surface;
    at least one light-aggregation component located on the first surface;
    at least one light source at least partially surrounded by the light-aggregation component; and
    a light-mix component positioned adjacent to the first surface and the at least one light-aggregation component thereof;
    wherein the light-mix component comprises a light-incident side, a light-emitting side opposite to the light-incident side, and a body part between the light-incident side and the light-emitting side, and wherein the light-incident side faces the first surface of the substrate and the at least one light-aggregation component;
    a light-absorbing component is disposed on a surface of the body part facing the at least one light source and positioned adjacent to the light-incident side.

18. The illumination device of claim 17, wherein the body part is hollow and has an inner cavity surface covered by a light reflecting material.

19. The illumination device of claim 17, wherein the light-absorbing component is made of a black material.

* * * * *